United States Patent
Kondo et al.

(10) Patent No.: US 7,035,485 B2
(45) Date of Patent: Apr. 25, 2006

(54) OPTICAL WAVEGUIDE DEVICE, AND A TRAVELLING WAVE FORM OPTICAL MODULATOR

(75) Inventors: Jungo Kondo, Nishikamo-gun (JP); Atsuo Kondo, Okazaki (JP); Kenji Aoki, Ogaki (JP); Osamu Mitomi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 68 days.

(21) Appl. No.: 10/495,340

(22) PCT Filed: Nov. 15, 2002

(86) PCT No.: PCT/JP02/11944

§ 371 (c)(1),
(2), (4) Date: May 20, 2004

(87) PCT Pub. No.: WO03/042749

PCT Pub. Date: May 22, 2003

(65) Prior Publication Data

US 2004/0264832 A1    Dec. 30, 2004

(30) Foreign Application Priority Data

Nov. 16, 2001 (JP) ............................ 2001-351142
Nov. 14, 2002 (JP) ............................ 2002-330325

(51) Int. Cl.
    *G02F 1/035* (2006.01)

(52) U.S. Cl. .................... 385/2; 385/14; 385/40; 385/129; 385/130; 385/131

(58) Field of Classification Search .............. 385/1, 385/2, 3, 14, 129, 130, 131, 132, 40, 8, 9
See application file for complete search history.

(56) References Cited

U.S. PATENT DOCUMENTS

| 5,138,480 A | * | 8/1992 | Dolfi et al. ............... 359/251 |
| 5,208,697 A | * | 5/1993 | Schaffner et al. .......... 359/254 |
| 5,339,369 A | * | 8/1994 | Hopfer et al. ............. 385/2 |
| 5,455,876 A | * | 10/1995 | Hopfer et al. ............. 385/2 |
| 5,502,780 A | | 3/1996 | Rangaraj ................... 385/131 |
| 5,991,067 A | | 11/1999 | Minakata et al. ......... 385/14 X |
| 5,991,491 A | | 11/1999 | Madabhushi .............. 385/131 |

(Continued)

FOREIGN PATENT DOCUMENTS

JP    A 64-18121    1/1989    ............... 385/14 X (Continued)

*Primary Examiner*—Brian M. Healy
(74) *Attorney, Agent, or Firm*—Oliff & Berridge, PLC

(57) ABSTRACT

An optical waveguide device 1 has an optical waveguide substrate 19, a supporting body 2 for supporting the substrate 19 and a joining layer 3 for joining the substrate 19 and the supporting body 2. The substrate 19 has a flat plate-shaped main body 4 made of an electro-optic material with a thickness of 30 μm or smaller and having first and second main faces 4a and 4b opposing each other, an optical waveguide provided on the side of the first main face 4a of the main body 4, and electrodes 7A to 7C provided on the side of the first main face 4a of the main body 4. The joining layer 3 joins the supporting body 2 at a joining face 4d and the second main face 4d of the main body 4. The joining face 2a of the supporting body 2 is substantially flat. Alternatively, the joining layer 3 has a thickness of 200 μm or lower.

15 Claims, 12 Drawing Sheets

U.S. PATENT DOCUMENTS

| | | | |
|---|---|---|---|
| 6,400,494 B1 | 6/2002 | Kondo et al. | 385/14 X |
| 2001/0004410 A1 | 6/2001 | Kondo et al. | 385/14 X |
| 2002/0126932 A1 | 9/2002 | Minakata et al. | 359/245 |
| 2002/0159738 A1 | 10/2002 | Aoki et al. | 385/129 |

FOREIGN PATENT DOCUMENTS

| | | | | |
|---|---|---|---|---|
| JP | A 06-300994 | 10/1994 | | 385/14 X |
| JP | A 9-211402 | 8/1997 | | 385/14 X |
| JP | A 10-82921 | 3/1998 | | 385/14 X |
| JP | A 10-142567 | 5/1998 | | 385/14 X |
| JP | A 2001-66561 | 3/2001 | | 385/14 X |
| JP | A 2001-235714 | 8/2001 | | 385/14 X |
| JP | A 2002-169133 | 6/2002 | | 385/14 X |
| JP | A 2002-357797 | 12/2002 | | 385/14 X |

\* cited by examiner

OPTICAL WAVEGUIDE DEVICE, AND A TRAVELLING WAVE FORM OPTICAL MODULATOR

FIELD OF THE INVENTION

The present invention relates to optical waveguide devices and travelling-wave optical modulators utilizing the same.

BACKGROUND OF THE INVENTION

It has been strongly demanded to realize a broadband modulation of communication as the progress in the field of so-called multi media. An optical transmission system is thus in use at a frequency of 10 Gb/s or higher, and more high speed modulation is expected. An LN optical modulator has been used as an a device for modulating light by an electrical signal (microwave signal) at 10 Gb/s or higher.

It has been invented a structure for realizing the velocity matching between microwave signal and light wave by forming a thinner portion in an optical waveguide substrate, so that the modulating bandwidth of the optical modulator is made broader. It is described to form a groove at the back side of an optical waveguide substrate in Japanese patent publications 10-82, 921A and 2001-6651A.

Further, in a structure having an optical waveguide substrate whose thickness is partly reduced, it is necessary to make the thickness around an optical waveguide at about 10 µm for attaining the velocity matching condition. The assignee has filed a Japanese patent publication 2002-109, 133A disclosing a structure having two-step groove at the back face of the substrate for preventing the flattening of the optical field pattern and reducing the propagating loss of light generated by the surface roughness and damage introduced in thinning and formation steps of groove in the substrate. When the two-step groove is formed at the back face of the substrate, it is also possible to reduce the thickness of the substrate over the whole of it and to form the groove thereafter. The assignee filed a Japanese patent publication 2001-101729A and disclosed that a reinforcing body is provided for supporting the substrate having the groove for maintaining the mechanical strength of the device.

In a device described in Japanese patent publication 9-211402A, an air layer is provided in the supporting body so that the velocity matching condition is attained. Further, in a device described in Japanese Patent publication 2001-235, 714A, an optical waveguide is provided on the adhesion face of the optical waveguide substrate joined with the reinforcing body.

DISCLOSURE OF THE INVENTION

In each of the devices disclosed in the patent publications, a groove is formed on the back face of a substrate for modulation, and the substrate and supporting body are joined with each other with a joining layer formed of a material having a low dielectric constant. It has been proved that in such structure, the temperature and DC drifts may be increased when an excessive load is applied in tests for reliability such as thermal shock and thermal cycle tests.

An object of the present invention is to provide an optical waveguide device having an optical waveguide substrate, a supporting body supporting the substrate and a joining layer joining the substrate and supporting body, so that the reliability such as temperature and DC drifts can be improved when an excessive load is applied in a reliability test such as thermal shock and temperature cycle tests.

A first aspect of the present invention provided an optical waveguide device having an optical waveguide substrate, a supporting body for supporting the substrate, and a joining layer joining the substrate and supporting body. The optical waveguide substrate comprises a flat plate-shaped main body made of an electro-optic material, having first and second main faces opposing each other and having a thickness of 30 µm or smaller. The substrate further has an optical waveguide provided on the side of the first main face of the main body and an electrode provided on the side of the first main face. The joining layer joins the joining face of the supporting body and the second main face of the main body, and the joining face of the supporting body is substantially flat.

The inventors have reached the idea of using a flat plate shaped main body having a thickness of 30 µm or smaller, and joining the main body and a supporting body with a joining layer, in which the joining face of the supporting body is substantially flat. In other words, the main body is made of a flat plate having a thickness of 30 µm or smaller without forming a groove at the back face of the main body for an optical modulator. That is, when an optical waveguide substrate for a modulator with a groove formed at the back face is joined with a supporting body, it is proved that a stress is concentrated at the wall face facing the groove due to differences of thermal expansions of the optical waveguide substrate, electrode material and joining agent. The mechanism is found by an analysis of thermal stress due to finite element method. Further, a step of forming a groove on the back face of the optical waveguide substrate is performed by means of excimer laser, micro grinder or sand blasting. It is, however, not possible to completely remove the processing damage according to each of the processing methods. It is thus proved that the fracture strength of at the damaged portion is lowered by 30 percent or more than the normal value due to the influences of micro cracks. It is considered that the stress concentration in the optical waveguide substrate for modulator results in distribution in resistivity in the substrate, so that the difference of a CR time constant is introduced, leading to DC or temperature drifts.

On the contrary, according to the first aspect of the present invention, a flat plate-shaped main body having a thickness of 30 µm or smaller is used and joined with a supporting body with a joining layer, and the joining face of the supporting body is made substantially flat. It is thus possible to make the thickness of the joining layer substantially constant to remove the regions susceptible to stress concentration in the optical waveguide substrate. The maximum stress applied onto the optical waveguide substrate can be thus reduced. Further, the thickness of the main body can be reduced by polishing in an appropriate conditions to considerably reduce the processing damage and to prevent the deterioration of fracture strength at the same time.

Further, a second aspect of the present invention provides an optical waveguide device having an optical waveguide substrate, a supporting body for supporting the substrate, and a joining layer joining the substrate and supporting body. The optical waveguide substrate comprises a flat plate-shaped main body made of an electro-optic material, having first and second main faces opposing each other and having a thickness of 30 µm, or smaller. The substrate further has an optical waveguide provided on the side of the first main face of the main body and an electrode provided on the side of the first main face of the main body. The joining layer joins the joining face of the supporting body and the second main face of the main body, and the joining layer has a thickness of 200 μm or smaller.

According to the second aspect of the present invention, a flat plate-shaped main body having a thickness of 30 μm or smaller is used and joined with a supporting body with a joining layer, and the thickness of the joining layer is made 200 μm or smaller. It is thus possible to disperse the stress in the optical waveguide substrate and to reduce the maximum stress applied on the substrate.

The present invention further provides optical modulator with traveling-wave electrode having each of the optical waveguide substrates, wherein a voltage is applied on the electrode for modulating light propagating in the optical waveguide.

BEST MODES FOR CARRYING OUT THE INVENTION

Figure 1:
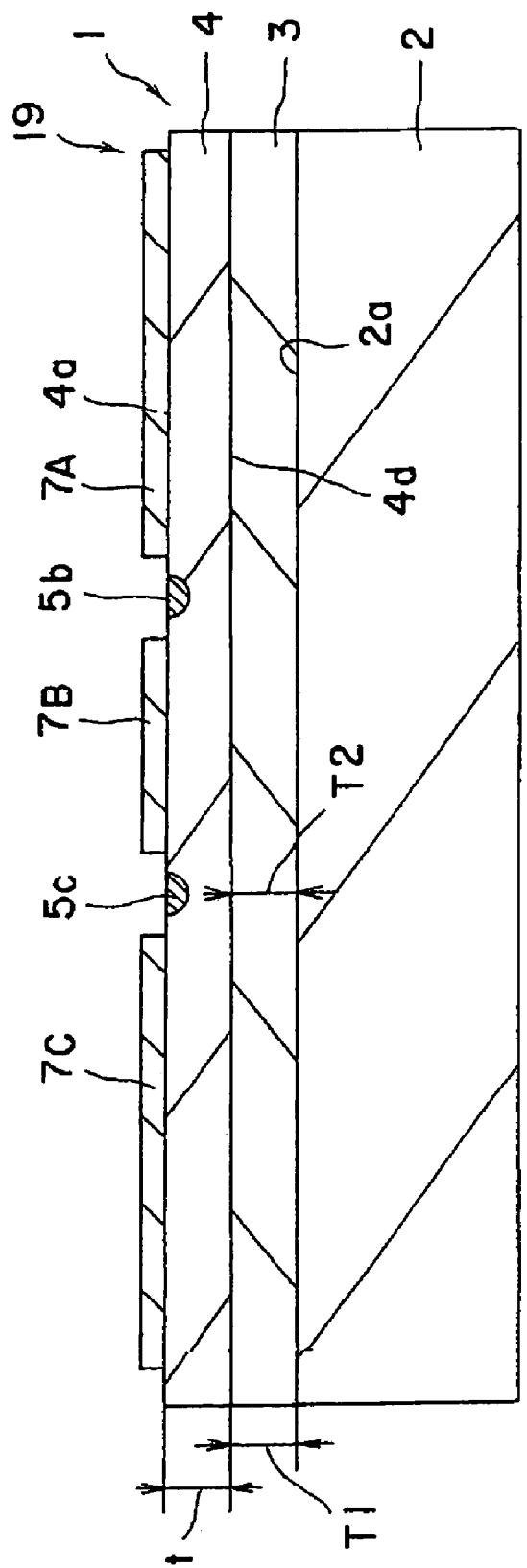
FIG. 1 is a cross sectional view schematically showing a device 1 according to first embodiment of the invention.

The invention will be further described in detail referring to the attached drawings. FIG. 1 is a cross sectional view schematically showing an optical modulator 1 according mainly to the first aspect of the invention. FIG. 1 shows a cross section substantially perpendicular to a direction of light propagation in this optical modulator with a travelling-wave electrode.

The optical modulator 1 has an optical waveguide substrate 19 and a supporting substrate 2. Both of the main body 4 and substrate 2 are flat plate-shaped. The main body 4 has a thickness of 30 μm or smaller. Predetermined electrodes 7A, 7B and 7C are formed on a first main face 4a of the main body 4. Although it is applied a so-called coplanar waveguide type electrode (CPW electrode) configuration in this example, the configuration of electrodes are not particularly limited. A so-called ACPS type electrode pattern may be also applied. In this example, a pair of optical waveguides 5b and 5c are formed between the neighboring electrodes, so that a signal voltage may be applied onto each optical waveguide 5b or 5c in a direction substantially parallel with the main face. The optical waveguide is of Mach-Zehnder type structure, which is well known (illustrated later). A joining layer 3 is provided between the second main face 4d of the main body 4 and the joining face 2a of the supporting body 2 for joining them.

According to the optical waveguide device 1, the flat plate-shaped substrate having a thickness of 30 μm or smaller is used and joined with the supporting body with the joining layer, and the joining face 2a of the supporting body is made substantially flat. The thickness of the joining layer 3 is thus made substantially flat to remove the positions of the stress concentration in the substrate 19. The stress can be dispersed so that the maximum stress applied on the optical waveguide substrate 19 can be reduced. Further, when the thickness of the main body 4 is reduced by processing to 30 μm or smaller, surface grinding can be used under appropriate conditions to considerably reduce the processing damage and to prevent the deterioration of fracture strength at the same time.

According to the first and second aspects of the present invention, the main body 4 is composed of a flat plate having a thickness of 30 μm or smaller. The "flat plate" means a flat plate without a recess or groove on the main face 4d. That is, the main face joining face) 4d is substantially flat. According to the present invention, however, a surface roughness, curve and warping generated by the processing are permitted and deemed as being substantially flat.

According to the first and second aspects of the present invention, the optical waveguides 5b, 5c are provided on the side of the first main face 4a of the main body 4. The optical waveguide may be a ridge type optical waveguide directly formed on the first main face of the main body, or a ridge type optical waveguide formed on another layer on the first main face of the main body. Alternatively, the optical waveguide may be an optical waveguide formed by inner diffusion process such as titanium delusion process, or an optical waveguide produced by ion exchange process such as proton exchange. Specifically, the optical waveguide is a ridge-type optical waveguide protruding from the main face 4a. The ridge type optical waveguide may be formed by laser or mechanical processing. Alternatively, a film having a high refractive index is formed on the main body 4, and the film having a high refractive index is then subjected to mechanical or ablation processing to form a ridge type optical waveguide. The film having a high refractive index may be formed by, for example, chemical vapor deposition, physical vapor deposition, organic metal chemical vapor deposition, sputtering or liquid phase epitaxy methods.

The electrode is formed on the side of the first main face of the main body. Specifically, the electrode may be directly formed on the first main face of the main body, or on a low dielectric layer or buffer layer formed on the first main face. The low dielectric layer may be made of any known material such as silicon dioxide, magnesium fluoride, silicon nitride and alumina. The low dielectric layer means a layer made of a material having a dielectric constant lower than that of a material constituting the main body. When the low dielectric layer is not provided, the thickness of the main body may more preferably be 20 μm or smaller on the viewpoint of the velocity matching condition.

According to the first aspect of the present invention, the joining face 2a of the supporting body 2 is substantially flat. According to the present invention, however, a surface roughness, curve and warping remaining after the processing are permitted and deemed as the joining face 2b is substantially flat.

On the viewpoint of the first aspect of the present invention, the thickness "T1" of the joining layer 3 may preferably be 1000 μm or smaller, and more preferably be 300 μm or smaller, and most preferably be 100 μm or smaller. The lower limit of the thickness "T1" of the joining layer 3 is not particularly limited, and may preferably be 10 μm or more on the viewpoint of reducing the effective refractive index of micro wave.

Figure 2:
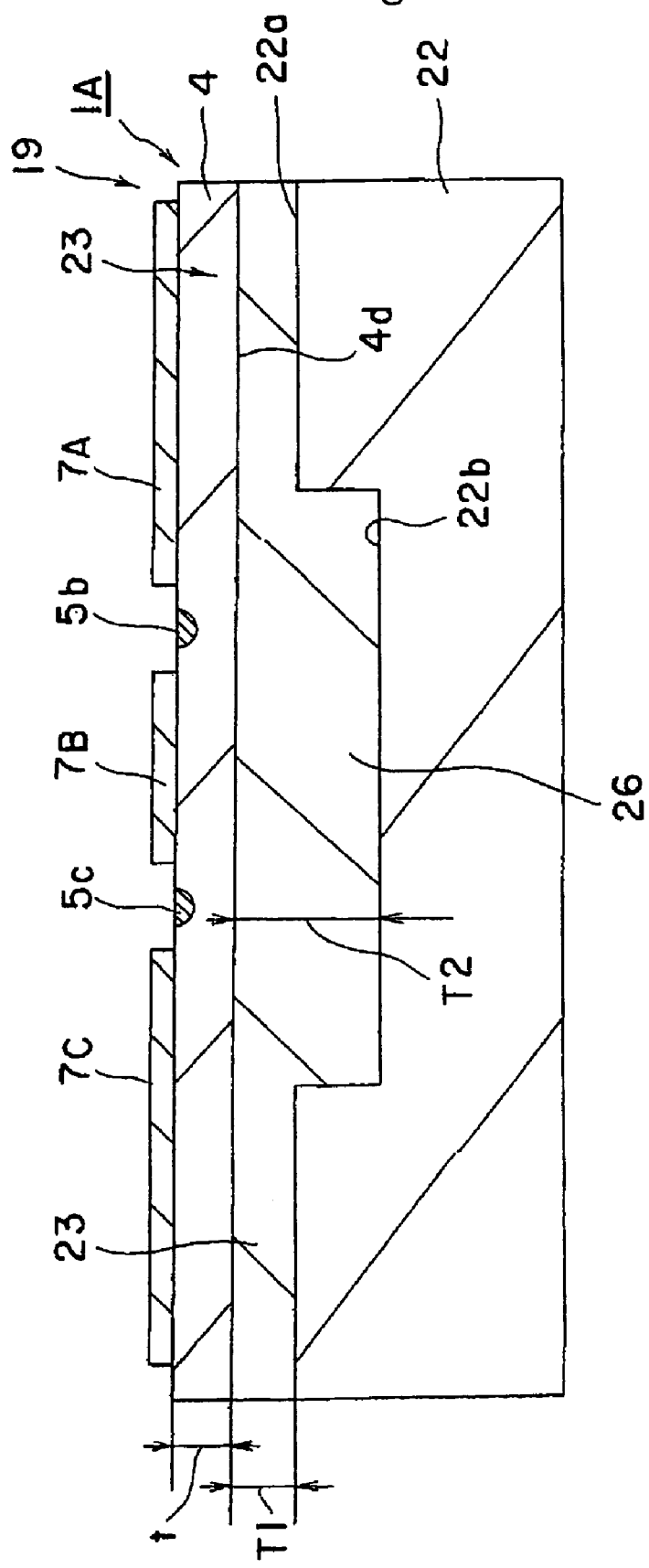
FIG. 2 is a cross sectional view schematically showing a device 1A according to another embodiment of the invention.

FIG. 2 is a cross sectional view schematically showing an optical waveguide device 1A according to an embodiment mainly of the second aspect of the present invention. FIG. 2 shows a cross section substantially perpendicular to a direction of light propagation in this travelling waveguide optical modulator.

The optical modulator 1A has an optical waveguide substrate 19 and a supporting body 22. The main body 4 is flat plate-shaped and has a thickness of 30 μm or smaller. The construction of the optical waveguide substrate 19 is substantially same as that of the substrate 19 shown in FIG. 1. A recess or groove 22b is formed on the side of the joining face 22a of the main body 22. The groove 22b is elongated in a direction of propagating light (a direction perpendicular to the paper face).

In the present example, a joining layer 23 is provided between the second main face 4d of the main body 4 and joining face 22a of the supporting body 22 so that the main body 4 and supporting body 22 are joined with each other. At the same time, a groove 22 is formed under the main face 4d in a region where the optical waveguides 5b, 5c are formed. A low dielectric portion 26 made of an adhesive is filled in the groove 22b.

According to the optical waveguide device 1A, the flat plate-shaped main body 4 having a thickness of 30 μm or smaller is used and joined with the supporting body 22 with the joining layer 23, and the thickness "T1" of the joining layer 23 is made 200 μm or smaller. The stress can be dispersed in the optical waveguide substrate 19 so that the maximum stress applied on the optical waveguide substrate 19 can be reduced.

In the present embodiment, however, the thickness "T2" of the low dielectric portion 26 made of an adhesive is made larger than the thickness "T1" of the joining layer 23, so that a step of a height of "T2−T1" is generated in the thickness of the joining layer. The structure is more susceptible to the stress concentration on the main body 4 around the step, which is different from the case where the thickness of the joining layer is made substantially constant over the whole of the joining layer. It is necessary to make the thickness "T1" of the joining layer 23 to 200 μm or smaller for reducing DC and temperature drifts due to such stress concentration.

On the viewpoint of the second aspect of the present invention, it is necessary that the thickness "T1" of the joining layer 3 is made 200 μm or smaller. The thickness "T1" may preferably be 150 μm or smaller, and more preferably be 110 μm or smaller. Although the lower limit of the thickness "T1" of the joining layer 3 is not particularly limited, the thickness may be 0.1 μm or larger on the viewpoint of reducing the stress applied on the main body 4.

According to the first and second aspects of the present invention, the joining layer may join the second main face and supporting body in a region where an optical waveguide is formed. For example, the optical waveguide devices 1 and 1A of FIGS. 1 and 2 relate to this embodiment. In this case, as shown in FIG. 1, it is preferred that the thickness of the joining layer is substantially constant. According to the present embodiment, a manufacturing error or deviation is deemed as being substantially constant.

Further, according to the first and second aspects of the present invention, a low dielectric portion having a dielectric constant lower than that of an electro-optic material for the main body may preferably be provided between the second main face and supporting body in a region where an optical waveguide is formed. The velocity matching described above can be realized more easily.

The kind of the low dielectric portion is not particularly limited. In a preferred embodiment, the low dielectric portion is an air layer. Further, in another embodiment, the low dielectric portion is made of an adhesive (examples of FIGS. 1 and 2). In this case, it is needed to use an adhesive having a dielectric constant lower than that of the electro-optic material.

Further in another embodiment, the low dielectric portion is made of a material having a dielectric constant lower than that of the electro-optic material and the low dielectric material does not belong to an adhesive.

Figure 3:
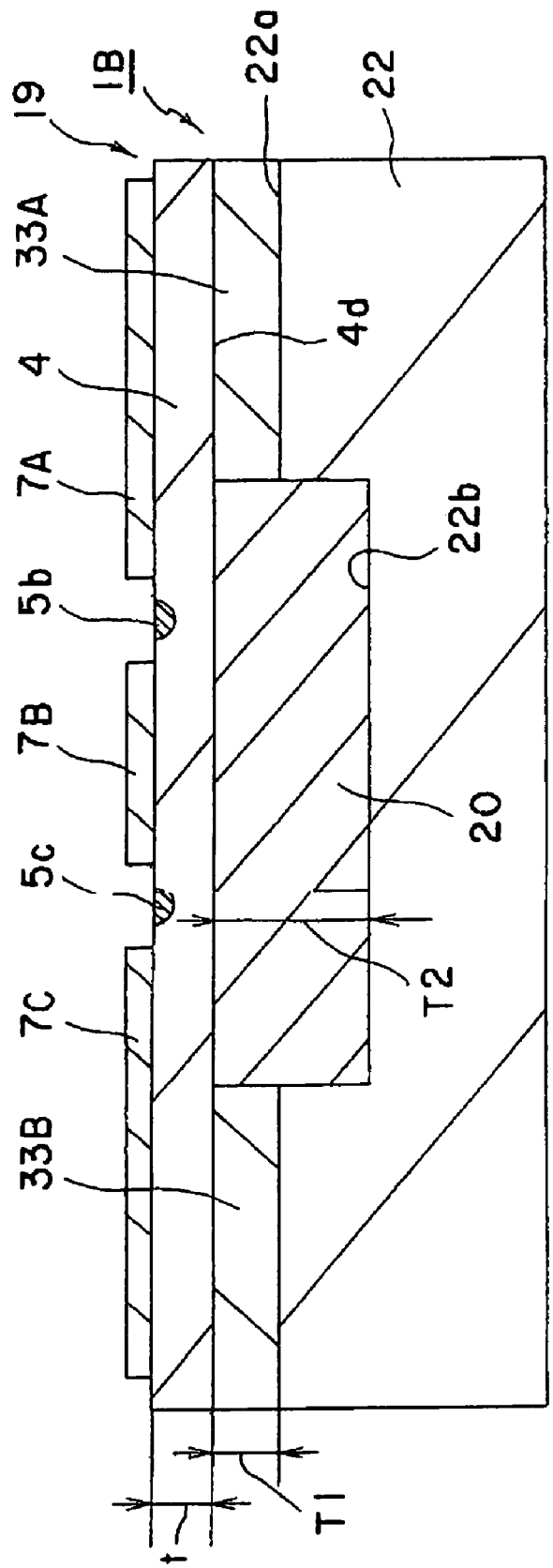
FIG. 3 is a cross sectional view schematically showing a device 1B according to still another embodiment of the invention.

FIG. 3 is a cross sectional view schematically showing an optical waveguide device 1B. The optical modulator 1B has an optical waveguide substrate 19 and a supporting body 22. The main body 4 is flat plate-shaped and has a thickness of 30 μm or smaller. A recess or groove 22b is formed on the side of the joining face 22a of the main body 22. The groove 22b is elongated in a direction of propagating light (a direction perpendicular to the paper face).

In the present example, joining layers 33A and 33B are provided between the second main face 4d of the main body 4 and joining face 22a of the supporting body 22 so that the main body 4 and supporting body 22 are joined with each other. At the same time, a groove 22b is formed under the main face 4d in regions where the optical waveguides 5b, 5c are formed. A low dielectric portion 20 is provided in the groove. The low dielectric portion 20 is made of a low dielectric characteristic different from those for the adhesives 33A and 33B.

Figure 4:
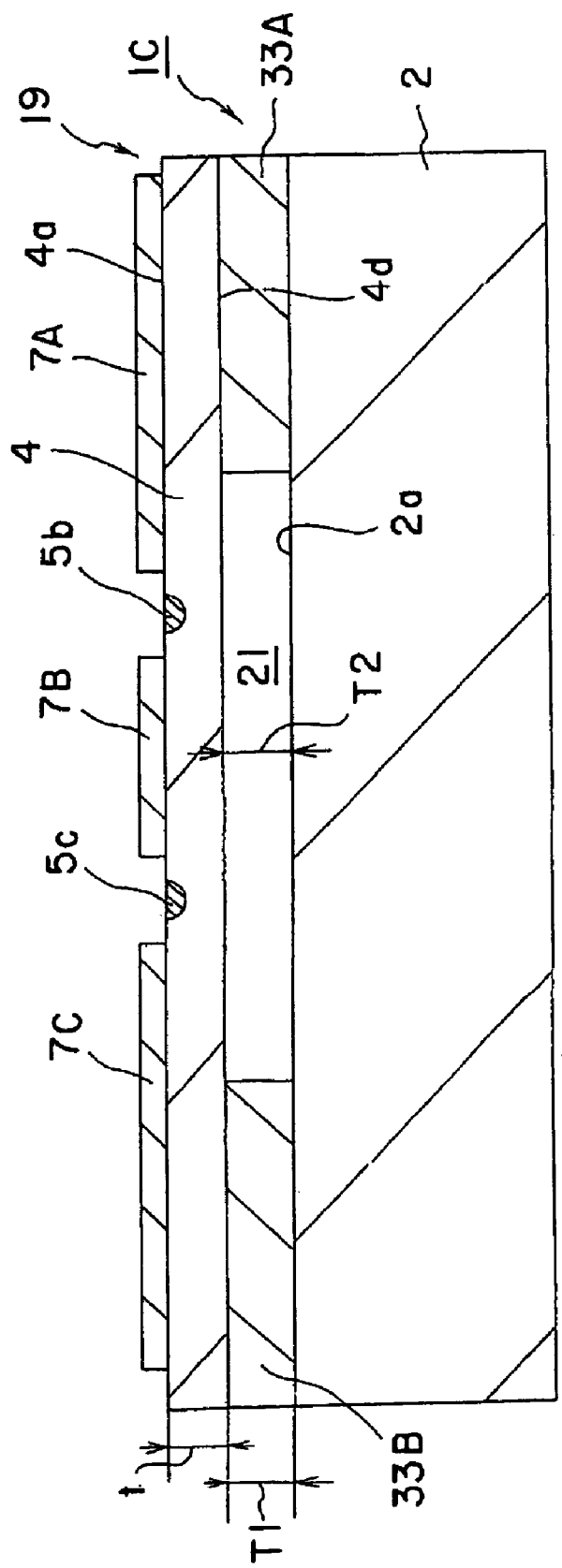
FIG. 4 is a cross sectional view schematically showing a device 1C according to still another embodiment of the invention.

FIG. 4 is a cross sectional view schematically showing an optical waveguide device 1C. The optical modulator 1C has an optical waveguide substrate 19 and a supporting body 2. The main body 4 is flat plate-shaped and has a thickness of 30 μm or smaller. The joining face 2a of the supporting body 2 is substantially flat.

In the present example, joining layers 33A and 33B are provided between the second main face 4d of the main body 4 and joining face 2a of the supporting body 2 so that the main body 4 and supporting body 2 are joined with each other. At the same time, an air layer 21 is formed under the main face 4d in regions where the optical waveguides 5b, 5c are formed. The air layer 21 functions as a low dielectric portion.

Figure 5:
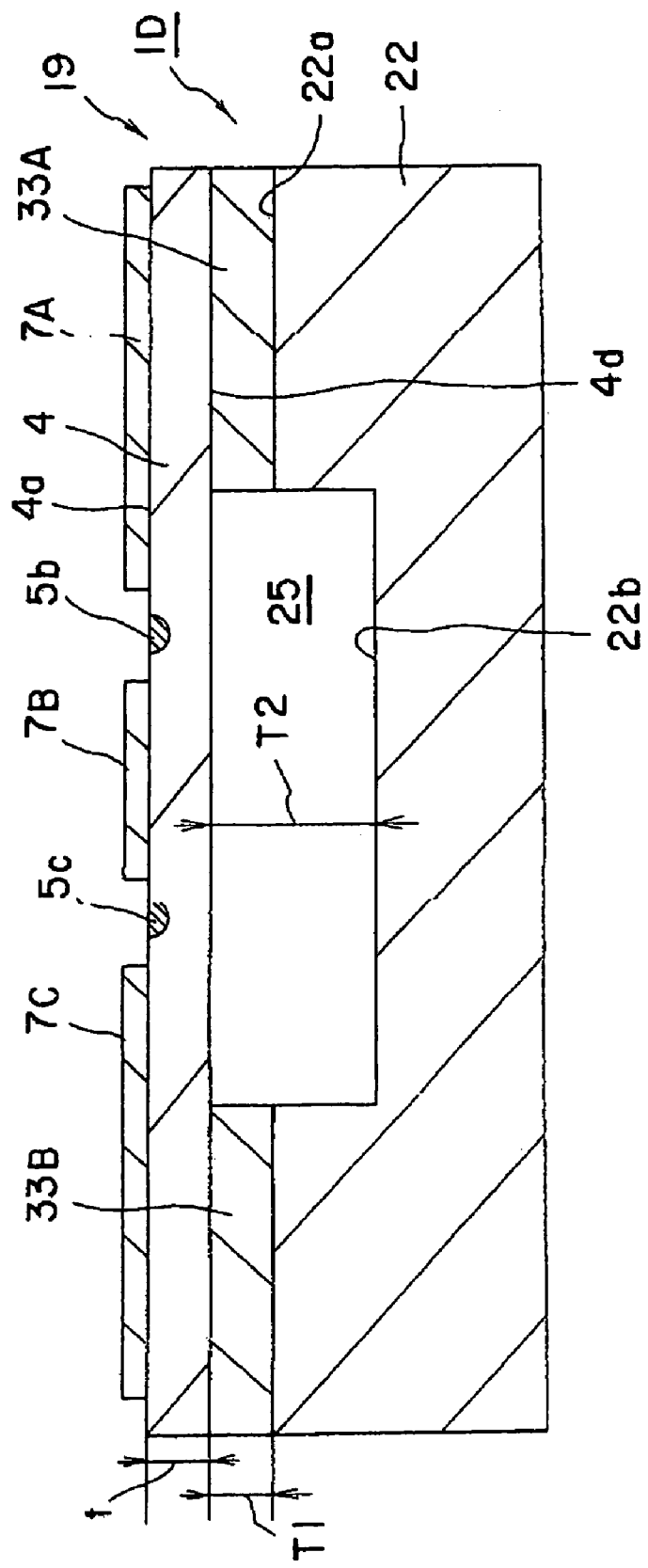
FIG. 5 is a cross sectional view schematically showing a device 1D according to still another embodiment of the invention.

FIG. 5 is a cross sectional view schematically showing an optical waveguide device 1D. The optical modulator 1D has an optical waveguide substrate 19 and a supporting body 22. The main body 4 is flat plate-shaped and has a thickness of 30 μm or smaller. A recess or groove 22b is formed on the side of the joining face 22a of the main body 22.

In the present example, joining layers 33A and 33B are provided between the second main face 4d of the main body 4 and joining face 22a of the supporting body 22 so that the main body 4 and supporting body 22 are joined with each other. The thickness "T1" of each of the joining layers 33A and 33B are 200 μm or smaller. At the same time, an air layer 25 is formed under the main face 4d in regions where the optical waveguides 5b, 5c are formed. The air layer 25 functions as a low dielectric portion.

On the viewpoint of velocity matching, the thickness "T2" of each of the low dielectric portions 20, 25 and 26 may preferably be 10 μm or larger, and more preferably be 30 μm or larger. The thickness "T2" of each of the low dielectric portions 20, 25 and 26 may preferably be 0.5 μm or lower and more preferably be 1000 μm or lower.

Figure 6:
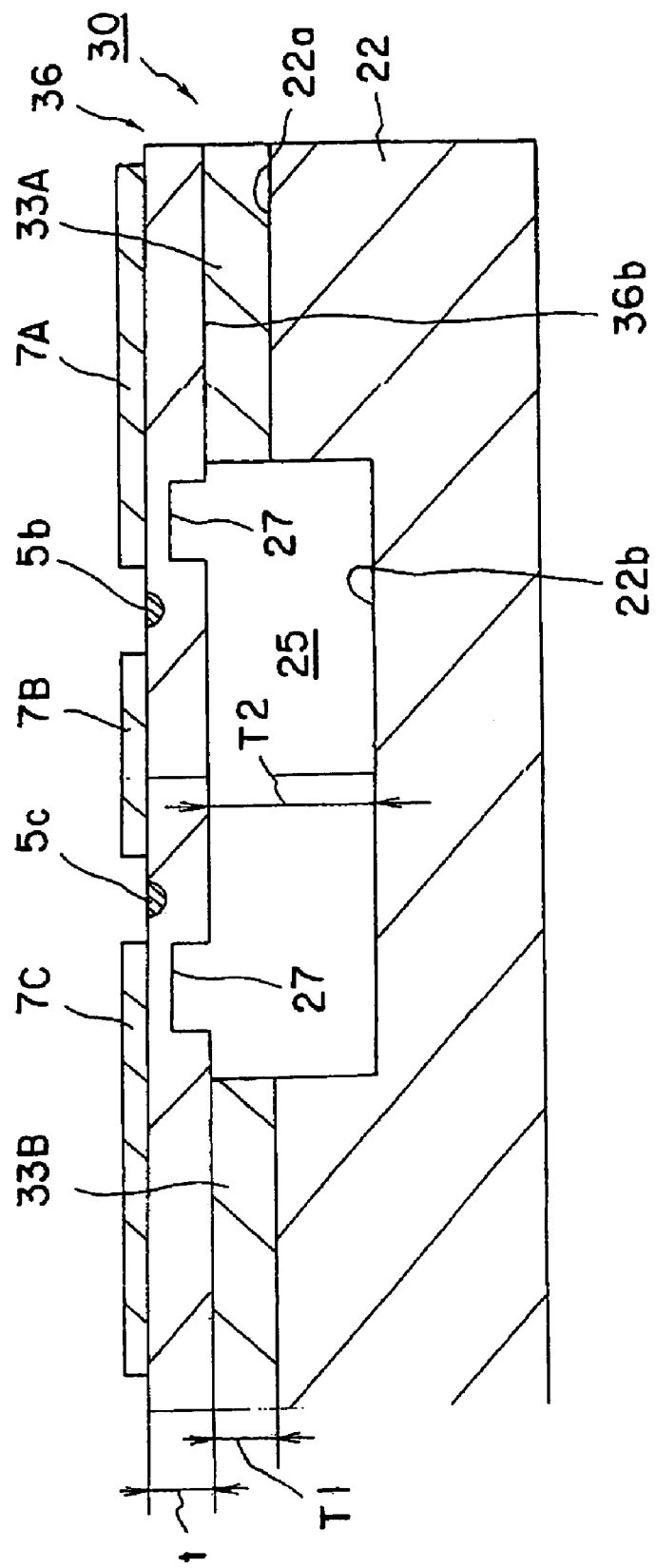
FIG. 6 is a cross sectional view schematically showing a device 30 according to a comparative example.

FIG. 6 shows an optical waveguide device 30 according to a comparative example. The supporting body 22 of the present example is substantially same as the supporting body shown in FIG. 5. In the present example, a groove 27 is formed on the side of a main face 36b of a main body 36 constituting an optical waveguide device. The groove 27 is communicated with an air layer 25.

The invention may be applied to an optical modulator with a travelling-wave electrode of so-called independent modulation type.

The main body constituting the optical waveguide substrate is made of an electro-optic material having ferroelectricity and may preferably be made of a single crystal. Such crystal is not particularly limited as far as it is effective for light modulation, and includes lithium niobate, lithium tantalate, lithium niobate-lithium tantalate solid solution, potassium lithium niobate, KTP, GaAs and quartz. Single crystals of lithium niobate, and lithium tantalate, lithium niobate-lithium tantalate solid solution are particularly preferred.

The electrode may be made of a material not particularly limited so long as it has a low resistance and excellent impedance properties, including gold, silver, copper or the like.

The material for the supporting body may preferably be a material having a dielectric constant lower than that of the electro-optic material, for minimizing the influence of the supporting body on the propagating velocity of microwave signal. Such material includes a glass such as quartz glass or the like.

In the main body, the polarization axis of the crystal may preferably be substantially parallel with the first main face (surface) of the main body. In this embodiment, it is preferred an X-cut or Y-cut plate of single crystal of lithium niobate, lithium tantalate or lithium niobate-lithium tantalate solid solution. FIGS. 1 to 5 show examples where the main body is of an X-cut or Y-cut plate.

Alternatively, in another preferred embodiment, the polarization axis of crystal is substantially perpendicular to the first main face (surface) of the substrate. In this embodiment, it is preferred a Z plate made of lithium niobate, lithium tantalate or lithium niobate-lithium tantalate solid solution. When a Z plate is used, it is necessary to provide the optical waveguide just under the electrode. Since such configuration tends to increase the propagation loss of light, a buffer layer may preferably be provided between the surface of the substrate and electrode for reducing the propagation loss of light.

The kind of such adhesive agent is not particularly limited as far as it satisfies the aforementioned conditions. The adhesive includes an epoxy adhesive, a thermal setting type adhesive, an ultraviolet curable adhesive, and a ceramic adhesive having a thermal expansion coefficient near that of the electro-optic material such as lithium niobate and "ALON CERAMICS C" (manufactured by Toa Gosei Co., Ltd. And having a thermal expansion coefficient of $13 \times 10^{-6}$/K).

The above described adhesive glass may preferably have a low dielectric constant and a temperature range suited for the adhesion process (working temperature) of about 600° C. or lower. Furthermore, the glass may preferably provide a strength sufficient for the subsequent processing. The glare may preferably be a so-called solder glass having a composition of oxides selected from the group consisting of silicon oxide, lead oxide, aluminum oxide, magnesium oxide, calcium oxide, boron oxide, or the like.

Further, a sheet made of an adhesive may be interposed between the back face of the main body 4 and the supporting substrate to join them. Preferably, a sheet made of a resin adhesive of a thermosetting resin, photoresist resin or light thickening resin is interposed between the back face of the main body 4 and the supporting body and then cured. Such sheet may preferably be first of the followings.

That is, the sheet may preferably be a film made of a resin having a thickness of not larger than 300 μm, including "T-2000" (supplied by Hitachi Chemical Co. Ltd.), "CARBODILITE FILM" (supplied by Nisshinbo Industries Inc.) and "A-1400", "A-1500" and "A-1600" (supplied by Nagase Chemtech).

FIGS. 7 to 10 are drawings for explaining a control system using an optical waveguide device according to the present invention. The optical modulating device 1 according to the present embodiment may be that shown in FIG. 1. The second main face 4d of the main body 4 is joined with the surface 2a of the supporting body 2 through the adhesive layer 3. According to the present example, the main body 4 is made of a material having a dielectric constant higher than that of the joining layer 3, so that the main body 4 functions as a slab optical waveguide. An optical waveguide 5 of Mach-Zehnder type and modulating electrodes 7A, 7B and 7C are formed on the side of the surface 4a of the main body 4. The optical waveguide 5 has an input portion 5a, a pair of branched portions 5b, 5c and an output portion 5d. 5e represents a splitting point and 5f a recombining point. A method for modulating light propagating in the waveguide 5 and detailed construction of the electrodes are known and their explanation will be omitted.

Figure 7:
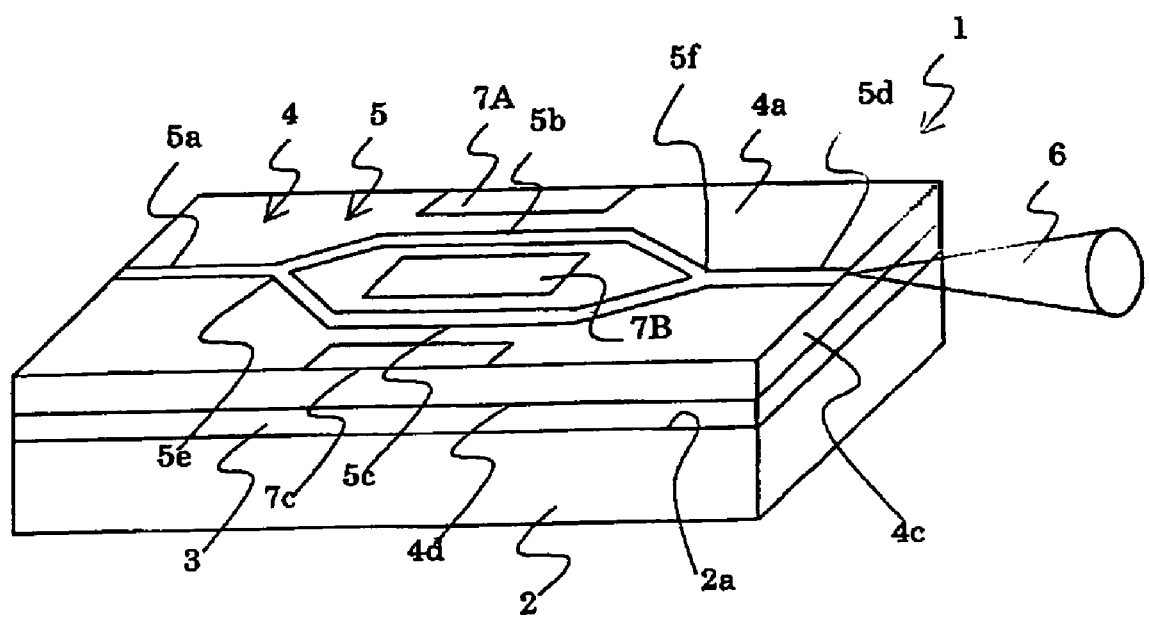
FIG. 7 is a cross sectional via schematically showing an optical modulator 1 emitting signal light 6.
Figure 9:
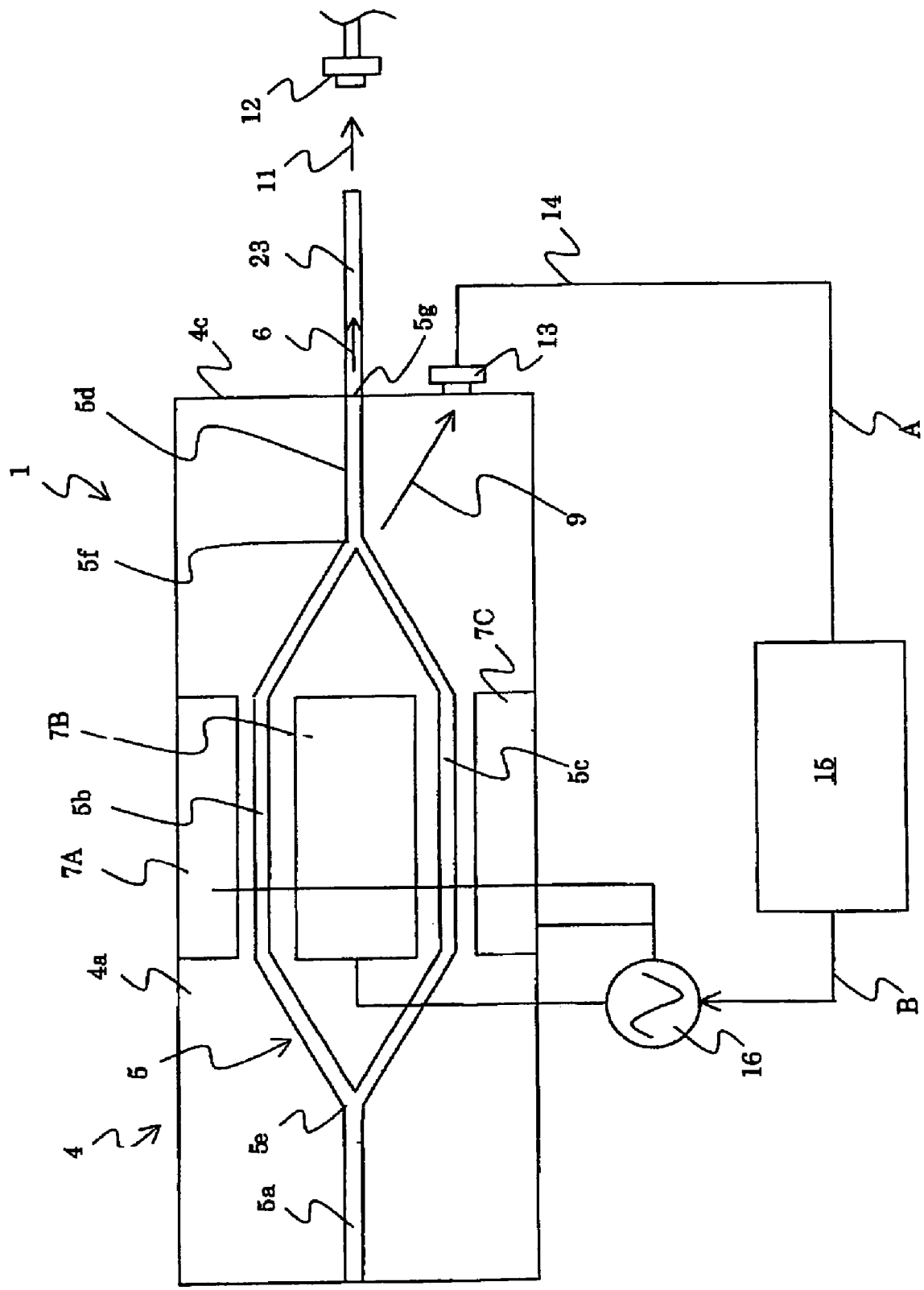
FIG. 9 is a block diagram showing an optical modulating system having an optical modulator 1, an optical detector 13, a controller 15 and a device 16 for controlling a power source.

As shown in FIGS. 7 and 9, a signal light is emitted as a numeral 6 from an end face 5g of the output portion 5d of the optical waveguide 5 in on-mode. The emitted light 6 is then transmitted through an optical fiber 23 and then irradiated from the fiber 23 as an arrow 11, which is detected by means of a photo detector 12.

Figure 8:
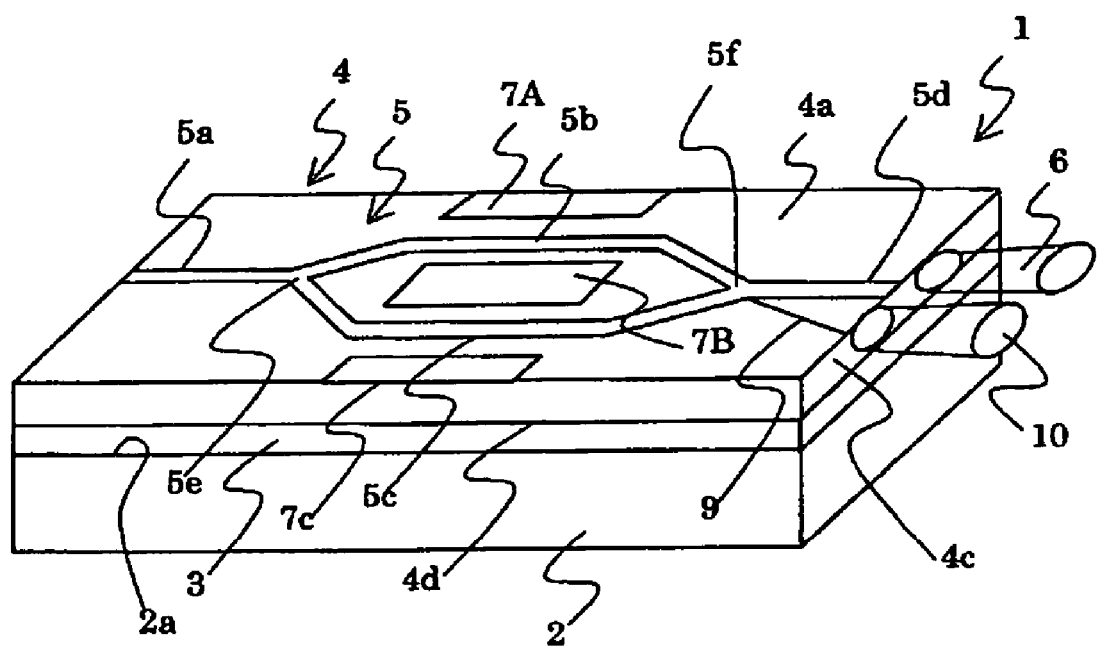
FIG. 8 is a perspective view schematically showing an optical modulator 1 emitting reference light 10 of off mode.

Light is not emitted from the optical waveguide in off-mode. Instead of this, as shown in FIG. 8, light is radiated from the recombining point 5f or near and propagated in the flat plate 4 as an arrow 9. The flat plate 4 may function as a slab optical waveguide so that light 9 is propagated in slab mode therein, by appropriately adjusting the thickness of the flat plate 4. The light is then emitted from the end face 4c of the slab optical waveguide 4 as a numeral 10.

A photo detector 13 is fitted onto the end face 4c of the slab optical waveguide 4 for receiving the light 9 propagating through the waveguide 4. The received light is converted into an electric signal in the photo detector 13. The electric signal is then transmitted to a controlling unit 15 through a cable 14 as an arrow "A". In the controlling unit 15, information of the light 9 of off-mode is drawn from the electric signal and utilized to calculate an appropriated value of a direct current bias. A controlling signal carrying the calculated value of the bias is then transmitted to a source controlling unit 16 as an arrow "B". The unit 16 may adjust or change the value of the direct current bias as needed.

A slab type or two-dimensional optical waveguide may be defined as follows. This is a waveguide having a thickness necessary for a function of confining-light in a specified direction when the waveguide is observed in a cross section perpendicular to a direction of light propagation. The waveguide also should function to propagate first or more propagating mode of light. Light of slab propagation-mode means light propagating in the slab type or two-dimentional optical waveguide while confined in a specified direction. The light of slab propagation mode is usually propagated in multi mode, that is, propagated in a plurality of propagation-modes.

The thickness of a slab optical waveguide is not particularly limited. The thickness may be designed so that a maximum efficiency is obtained, based on the wavelength of light used, the kind of photo detector, the direction of fitted photo detector, and the condensing efficiency of light propagating in the slab optical waveguide. For example, when a slab optical waveguide is made of lithium niobate, an adhesive layer with a low dielectric constant is applied as an underclad layer and a communication wavelength band of 1.55 µm is applied, the thickness of a slab optical waveguide may preferably be not larger than 30 µm. When a slab optical waveguide is too thin, however, light of off-mode is leaked into the adhesive layer by cut-off and prevented from the confinement and detection. The thickness of a slab optical waveguide may preferably be not smaller than 3 µm on this viewpoint.

In a preferred embodiment, as shown in FIG. 9, a photo detector is fitted onto the end face of a slab optical waveguide. It is thereby possible to eliminate the necessity of providing a photo detector separately outside of the substrate constituting the modulator. It is also possible to eliminate the necessity of an outer optical transmitter for transmitting light of off-mode emitted from the modulating device to the photo detector.

For example, in a modulator shown in FIGS. 7 to 9, when lithium niobate in used as a material for the slab optical waveguide 4 and supporting substrate, a standardized sensitivity provided by a common photo detector is stable and sufficiently larger than 0.4 A/W. On the contrary, when light of substrate radiation-mode is detected by a common photo detector, as in a prior art, the standardized sensitivity provided by such photo detector is proved to be about 0.4 A/W at maximum as well as unstable.

In another preferred embodiment, an optical transmitter is provided for receiving the light of off-mode and light emitted from the transmitter is then received by a photo detector. Although such optical transmitter may preferably be an optical fiber, it may also be a ferrule or the like. Such photo detector may preferably be fitted onto a surface of a wall constituting a package for an optical modulator.

Although the intensity of light may preferably be measured, the phase or wavelength of light may also be measured in a photo detector. The kind of a photo detector is not particularly limited. For example, when light is to be modulated using an electric signal of 10 Gb/s, it may be used a photo detector applying InGaAs system capable of a high speed response and a sufficiently large band width for the detection.

The optical waveguide shape or pattern of the recombining point is not particularly limited. The respective branched portions of the optical waveguide may be crossed or intersected at the recombining point, or may be spaced apart from each other without crossing at the recombining portion. It is, however, needed that the light energy propagating in the respective branched portions may be recombined at or around the recombining point.

At least a one pair of the branched portions are necessary, and two or more pairs of the branched portions may be provided. The optical waveguide may have so-called cascade-type branched structure.

Figure 10:
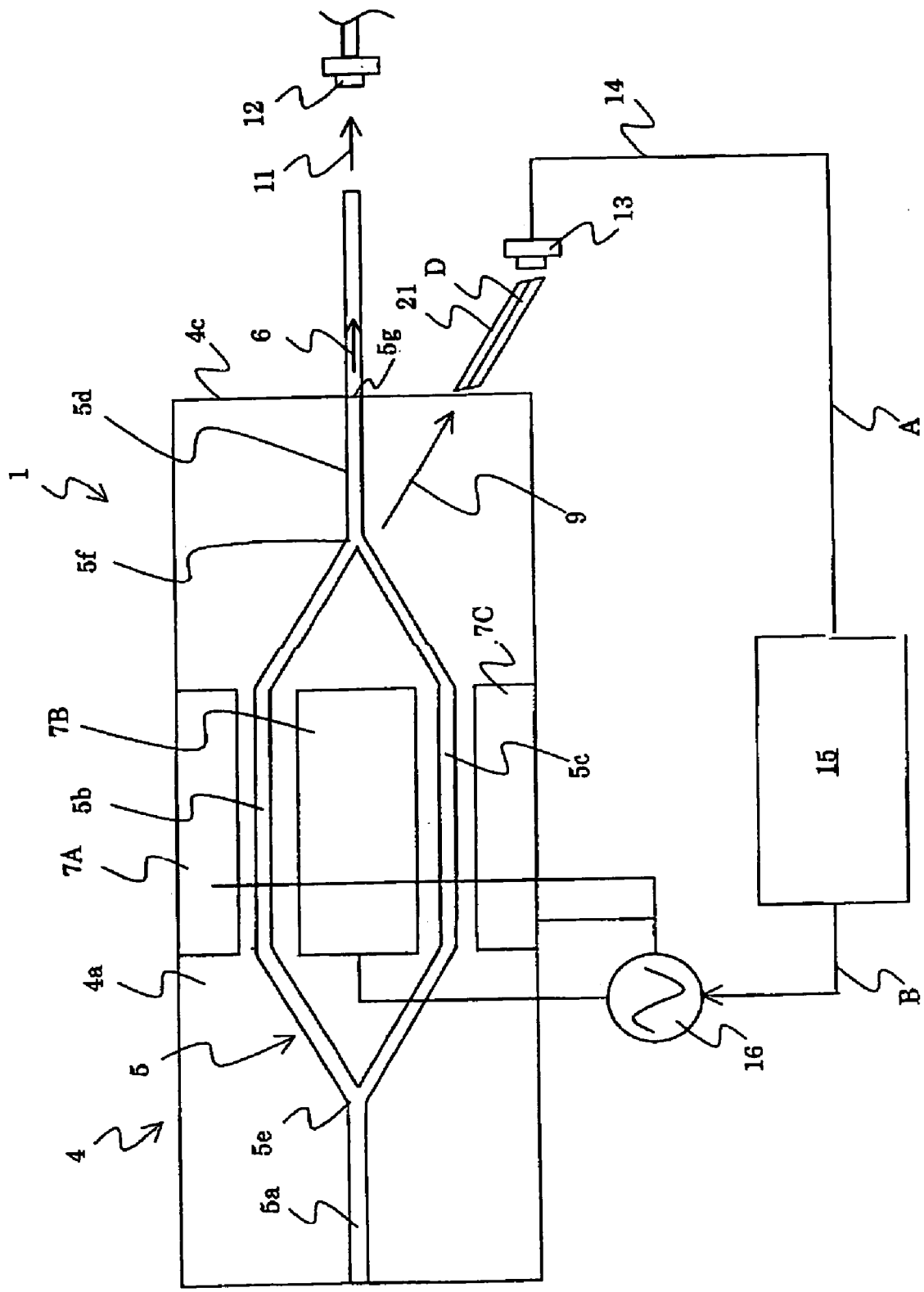
FIG. 10 is a block diagram showing another optical modulating system.

FIG. 10 schematically shows an optical modulator 1 for an optical modulating system is substantially same as that shown in FIG. 9. In FIG. 10, a photo detector 13 is fixed at a position distant from the end face 4c of the slab waveguide 4 of the device 1. An optical transmitter 21 is provided in a position opposing the end face 4c. The light 9 of slab propagation-mode is irradiated from the end face 4e, propagated as an arrow "D" in the transmitter 21 and then irradiated into the photo detector 13.

EXAMPLES

Production of a Device of Example 1

An optical modulator 1 of FIG. 1 is produced. Specifically, an X-cut 3 inch wafer (made of $LiNbO_x$ single crystal) was used as a substrate. An optical waveguide 3 of Mach-Zehnder type was formed in the surface area of the wafer by titanium diffusion with photolithography method. The size of the optical waveguide 3 was, for example, 10 µm at $1/e^2$. CPW electrodes were formed by electroplating. The gaps between the central electrode 7B and ground electrodes 7A and 7C are 40 µm, the thickness of the electrode is 28 µm and the length of electrode is 40 µm. A dummy substrate for polishing is adhered to a surface plate for polishing and the substrate for modulator is adhered to the plate with a thermoplastic resin with the electrodes facing downwardly. Further, the thickness of the main body 4 is reduced to 10 µm by lateral grinding and polishing (CMP). The main body 4 is then joined with a supporting body 2 having a shape of a flat plate with an adhesive and the connecting portion to an optical fiber is polished at the end face. The thus obtained joined body is cut out to chips. The joining was carried out using a film-shaped resin having a thickness of 50 µm. The width and total thickness including the reinforcing substrate are 4.4 mm and 1 mm, respectively. A single core fiber array supporting a 1.5 µm in single mode optical fiber is produced and connected with the travelling wave optical modulator chip 1. The optical axis of the fiber is adjusted with that of the optical waveguide and joined with an ultraviolet light curable resin adhesive.

Production of a Device According to Example 2

A device 1C shown in FIG. 4 was produced. Specifically, an optical waveguide substrate 19 was produced according to the same procedure as the example 1, The thickness "t" of the main body was 12 µm. Further, the air layer 21 was formed as shown in FIG. 4.

Production of a Device of Example 3

A device 1A shown in FIG. 2 was produced. Specifically, an optical waveguide substrate 19 was produced as the example 1. The substrate 19 was adhered to and joined with the supporting body 22 with a groove 22b having a width of 0.3 mm and a depth of 0.2 mm. The connecting part was polished at the end face and the thus obtained chip was cut out to chips. A resin adhesive 26 was filled in the groove 22b of the supporting body 22. "T1" was 50 µm and "T2" was 250 µm.

Production of Device of Example 4

A device 1D shown in FIG. 5 was produced Specifically, an optical waveguide substrate 19 was produced as the example 1. The thickness of the main body 4 was 12 μm. The optical waveguide substrate 10 was adhered to and joined with the supporting body 22 with a groove 22b having a width of 0.3 mm and a depth of 0.2 mm. The connecting part of the optical fiber was polished at the end face and the thus obtained chip was cut out to chips. The groove 22b was utilized as the air layer 25. "T1" was 50 μm and "T2" was 250 μm.

Production of a Device According to Comparative Example 1

The device 30 shown in FIG. 6 was produced. Specifically, the optical waveguide substrate 36 was produced as the example 1. The thickness of the main body 4 was 15 μm. Further, the groove 27 was formed by excimer laser so that the thickness of the substrate around the ground electrodes was 10 μm. The depth of the groove 27 was about 5 μm. The optical waveguide substrate 36 was adhered to and joined with the supporting body 22 with a groove 22b having a width of 0.3 mm and a depth of 0.2 mm formed therein The connecting part to an optical fiber was polished at the end face and the thus obtained chip was cut out to chips. A film-like resin having a thickness of 100 μm was used as the adhesive resin for joining. The groove 22b of the supporting body 22 was utilized as the air layer 25. "T1" was 100 μm and "T2" was 300 μm.

Production of a Device According to Comparative Example 2

The device shown in FIG. 2 was produced. Specifically, the optical waveguide substrate 19 was produced as the example 1. The thickness of the main body 4 was 10 μm. The main body 4 was adhered to and joined with the supporting body 22 with the groove 22b having a width of 0.3 mm and depth of 0.2 mm formed therein. The connecting part to an optical fiber was polished at the end face and the thus obtained chip was cut out to chips. The groove 22b of the supporting body 22 was filled with an adhesive resin 26. The thickness "t" of the adhesive layer 23 was 300 μm.

(Results of Reliability Test)

A thermal shock test was performed in a temperature range of −40° C./+85° C. Temperature drift was further measured in a temperature range of −20° C./+85° C. The results were shown in table 1.

TABLE 1

| | Thermal shock test Percentage of defects (number of defects/ total test number) | Temperature drift Dependency of bias (V) |
| --- | --- | --- |
| Example 1 | 0/10 | 0 |
| Example 2 | 0/10 | 0 |
| Example 3 | 0/10 | 0 |
| Example 4 | 0/10 | 0 |
| Comparative Example 1 | 7/10 | 7 |
| Comparative Example 2 | 3/10 | 3 |

Figure 11:
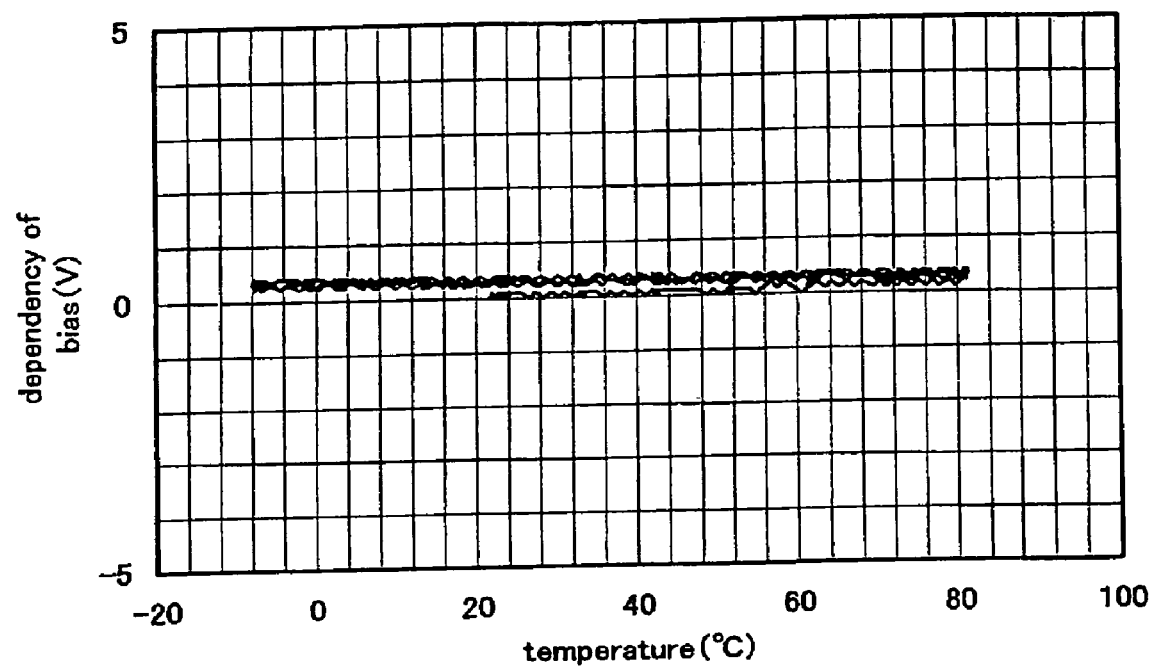
FIG. 11 is a graph showing the dependency of DC bias in a temperature range of −20° C. to +85° C. of a device 1 of an example 1.
Figure 12:
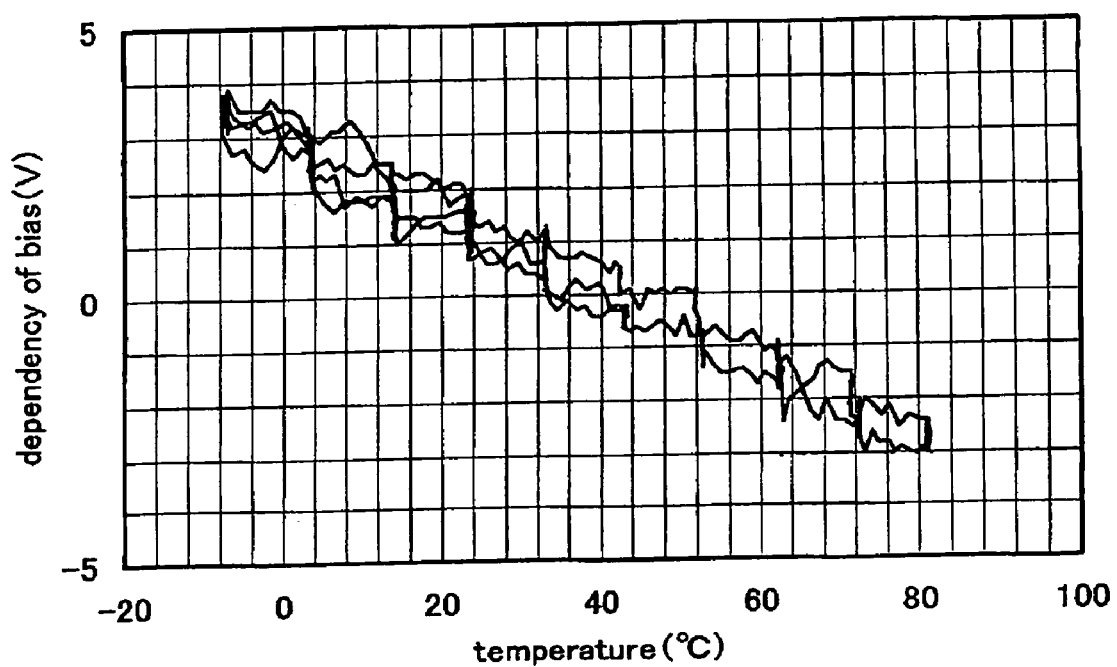
FIG. 12 is a graph showing the dependency of DC bias in a temperature range of −20° C. to +85° C. of a device of a comparative example 2.

Further, the dependency of DC bias of the device 1 of the example 1 in a range of −20° C./+85° C. is shown in FIG. 11, and the dependency of DC bias of the device 2 of the comparative example 2 in a range of −20° C./+85° C. is shown in FIG. 12.

As can be seen, the results of thermal shock test of the inventive examples 1 to 4 were excellent and show only few dependency of the DC bias. Contrary to this, the optical waveguide substrate 36 with a groove (see FIG. 6) was used in the comparative example 1, and the results of thermal shock and temperature drift tests were inferior to those of the inventive examples. Further, the device having a construction of FIG. 2 was used and the thickness "T1" of the joining layer was 300 μm, and the results of thermal check and temperature drift tests were inferior to those of the inventive examples.

According to the present invention, an optical waveguide device having an optical waveguide, a supporting body supporting the substrate and a joining layer joining the substrate and supporting body is provided, so that the reliability such as temperature and DC drifts in a reliability test such as thermal shock and temperature cycle tests can be improved even when an excessive load is applied.

The invention claimed is:

1. An optical waveguide device comprising an optical waveguide substrate, a supporting body for supporting said optical waveguide substrate and a joining layer for joining said optical waveguide substrate and said supporting body:
    wherein said optical waveguide substrate comprises a flat plate-shaped main body made of an electro-optic material with a thickness of 30 μm or smaller and having first and second main faces opposing each other, an optical waveguide provided on the side of said first main face of said main body, and an electrode provided on the side of said first main face of said main body, and wherein said joining layer joins a joining face of said supporting body and said second main face of said main body and said joining face is substantially flat.

2. The optical waveguide device of claim 1, wherein said joining layer joins said second main face and said supporting body in a region where said optical waveguide is provided.

3. The optical waveguide device of claim 1, wherein said joining layer has a substantially constant thickness.

4. The optical waveguide device of claim 1, comprising a low dielectric portion having a dielectric constant lower than that of said electro-optic material between said second main face and said supporting body in a region where said optical waveguide is provided.

5. The optical waveguide device of claim 4, wherein said low dielectric portion comprises an air layer.

6. The optical waveguide device of claim 1, wherein said joining layer has a thickness of 1000 μm or smaller.

7. An optical waveguide device comprising an optical waveguide substrate, a supporting body for supporting said optical waveguide substrate and a joining layer for joining said substrate and said supporting body:
    wherein said optical waveguide substrate comprises a flat plate-shaped main body made of an electro-optic material with a thickness of 30 μm or smaller and having first and second main faces opposing each other, an optical waveguide provided on the side of said first main face of said main body, and an electrode provided on the side of said first main face of said main body, and wherein said joining layer joins said supporting body and said second main face of said main body and said joining layer has a thickness of 200 μm or smaller.

8. The optical waveguide device of claim 7, wherein said joining layer joins said second main face and said supporting body in a region where said optical waveguide is provided.

9. The optical waveguide device of claim 7, comprising a low dielectric portion having a dielectric constant lower than that of said electro-optic material between said second main face and said supporting body in a region where said optical waveguide is provided.

10. The optical waveguide device of claim 9, wherein said low dielectric portion comprises an air layer.

11. The optical waveguide device of claim 9, wherein a low dielectric material having a dielectric constant lower than that of said electro-optic material is provided in said low dielectric portion.

12. The optical waveguide of claim 3, wherein said joining layer comprises a sheet of a resin adhesive.

13. Tho optical waveguide of claim 3, wherein a low dielectric layer is provided between said first main face of said optical waveguide substrate and said electrode.

14. The optical waveguide device of claim 13, wherein said low dielectric layer has a thickness of 1 micrometer or smaller.

15. A travelling wave optical modulator comprising said optical waveguide device of claim 1, wherein said electrode applies a voltage for modulating light propagating in said optical waveguide.

* * * * *